March 13, 1951 T. A. ST. CLAIR 2,545,118
SYSTEM FOR FILLING CONTAINERS BY WEIGHT
Filed Sept. 28, 1945
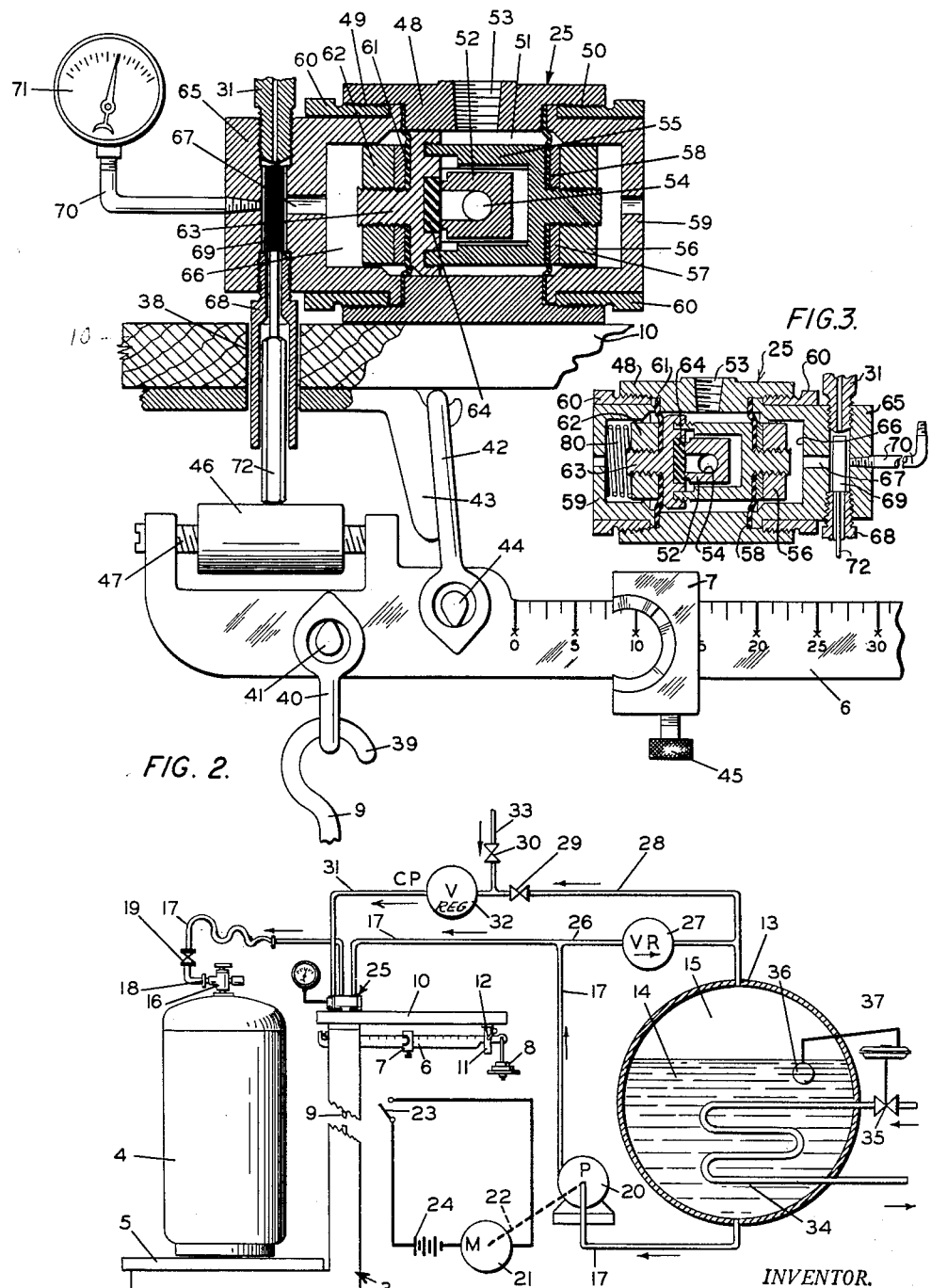
INVENTOR.
T. A. ST. CLAIR
BY Hudson & Young
ATTORNEYS Patented Mar. 13, 1951

2,545,118

UNITED STATES PATENT OFFICE 2,545,118

SYSTEM FOR FILLING CONTAINERS BY WEIGHT

Theodore A. St. Clair, Bartlesville, Okla., assignor to Phillips Petroleum Company, a corporation of Delaware Application September 28, 1945, Serial No. 619,187

12 Claims. (Cl. 249—63)

This invention relates to container filling systems. In a more specific aspect, it relates to a high-pressure flow shut-off valve for such systems. In another specific aspect, it relates to means for filling a container on a scale and shutting off the filling liquid when the scale registers a predetermined weight.

The specific valve 25 is claimed in applicant's copending divisional application, Serial No. 23,263, filed April 26, 1948. Said application has become abandoned.

In the art of filling containers with liquids, especially volatile liquids having a high vapor pressure, much time is lost watching the filling operation to prevent overfilling of the container. It is desirable, therefore, to provide an automatic scale operated filling system in which the liquid will be automatically cut off when the container has the proper predetermined contents therein.

One object of the invention is to provide a system for filling a container with a predetermined weight of liquid.

Another object is to provide a valve suitable for use in such a system which will operate properly to cut off the liquid.

Another object is to provide a low investment, low operating cost, accurate and durable automatic shut-off valve for filling pressure vessels by weight.

Another object is to provide a simplified system which can be attached to any standard make of scale.

Another object is to provide a cut-off valve without packing glands and which has balanced diaphragms for high sensitivity.

Another object is to provide a system which when attached to a scale will not interfere with normal manual weighings and in which the scale will operate as an indicating device to denote the filled or unfilled condition of the container.

Numerous other objects and advantages will be apparent to those skilled in the art upon reading the accompanying specification, claims and drawings.

Figure 1 is an elevational view with parts in cross-section and broken away showing a container filling system embodying the present invention.

Figure 2 is an enlarged elevational view of a portion of Figure 1 with parts broken away and in cross-section to show details of construction of the structure shown in Figure 1, which structure embodies the present invention.

Figure 3 is a cross sectional elevational view of a modified form of the combined pilot and motor valve employed in the present invention.

In Figure 1, any standard type of scale generally designated as 3 may be employed for weighing container 4, which container is to be filled. For purposes of illustration, scale 3 has been shown as the usual standard platform scale having a platform 5 for supporting container 4 and a scale beam 6 provided with the usual sliding weight 7 and removable weights 8 for setting a predetermined weight on the beam scale 6. Platform 5 is connected to beam 6 by the usual system of levers and fulcrums including a pull rod 9. As is customary in such scales, an arm 10 is provided having a link 11, arm 10 and link 11 protecting beam 6 and preventing undue movement thereof. Bell crank or latch means 12 is provided for locking beam 6 in a raised position when desired.

A source of liquid is provided generally in the form of a tank 13 containing liquid 14 and, in the case of a volatile liquid, vapor 15 thereof. Tank 13 is connected to the inlet 16 of container 4 by a liquid line 17. Inlet 16 may be of any desired type and any type of connection 18 may be employed. Liquid line 17 may contain manual shut-off valve 19 in order to save minor amounts of liquid that might otherwise flow out of 17 when 18 is disconnected.

While source 13 may be placed at a considerable elevation in which gravity flow through line 17 would be sufficient, in many cases container 13 is not as favorably located. In such cases, where gravity flow is impossible, pump 20 driven by motor 21 through shaft 22 is provided in liquid line 17 for pumping liquid therethrough. Obviously, motor 21 may be any prime mover, but preferably is an explosion proof electric motor driven by house current and controlled by explosion proof switch 23. For purpose of simplifying the drawing, a battery 24 is shown as the source of current, but obviously other electric power sources would be cheaper and are, therefore, used.

Container 13, of course, is supplied with a suitable inlet and with such drain valves, excess flow valves, safety valves, liquid level indicators, and other desirable or required appurtenances as may be desired on a container for the particular liquid being stored, such as methane, ethane, propane, butane, or any other liquid as may be old in the art of storing such liquids.

A combined pilot and motor valve built into a single housing and generally designated as 25 controls flow through line 17 and is preferably placed between pump 20 and container 4. The pilot valve is plug 69 which is moved by the pilot valve actuating stem 72 to close seat 68, or alternatively to close seat 31; while the motor valve is valve 64 actuated by a flexible diaphragm expansible-chamber motor 61, 62, 63 and 66. To provide relief of pressure in line 17 if motor valve 52, 64 is closed and pump 20 is operating, a return line 26 is provided leading back to tank 13 through a pressure relief valve 27 set to relieve a predetermined excess pressure from said liquid line 17 back to source 13.

In some instances, as when a loosely fitting centrifugal pump impeller is used in pump 20, return line 26 and relief valve 27 may be eliminated as the liquid in line 17 may, upon sufficient pressure, escape from being pumped by pump 20 by passing back between the impeller and the pump housing, but it is preferred to have return line 26 and relief valve 27, especially if pump 20 is of the reciprocating type or some other type of efficient pump which will not permit slippage of liquid.

In order to actuate motor valve 52, 64, a source of fluid under constant pressure is provided. Generally, it is more convenient to provide the fluid under constant pressure directly from source 13 by taking off vapors through vapor line 28 with valve 29 open and valve 30 closed. The vapor in the latter part of line 28 which is numbered 31 is kept at a constant pressure by any well known type of pressure regulating valve 32.

While this use of vapor pressure is convenient in the case of volatile liquids; when the liquid is less volatile, it is often desirable to have an independent source of pressure fluid shown in Figure 1 by pipe 33 which leads to a source of such pressure fluid (not shown). In this case, valve 29 is closed and valve 30 is open and the pressure fluid may be liquid, vapor, or gas. Preferably, I employ compressed air as the pressure fluid from an independent source, and, of course, this fluid is regulated by valve 32 and passes through pipe 31 to motor valve 25.

If it is desired to maintain the vapor pressure in portion 15 of tank 13 at a predetermined amount, this may be done by heating tank 13 in various ways.

For purpose of illustration, a water heating coil 34 is shown, the flow of water being controlled by motor valve 35 and the position of motor valve 35 being controlled by pressure fluid bulb 36 connected to a space above the diaphragm and spring (not shown) of motor valve 35 by pipe 37. Motor valves of the type of valve 35 are old.

Obviously, coil 34 could be replaced by an electrical resistance heater and valve 35 by an electrical switch controlled by a thermostat replacing bulb 36.

In Figure 2, it will be noted that combined pilot and motor valve housing 25 is mounted on top of arm 10 of scale 3 and the only change that has to be made in arm 10 is drilling a hole 38.

Pull rod 9 ends in the conventional hook 39 which pulls on yoke 40 which in turn pulls on fulcrum bases 41 which are generally integral with beam 6. A supporting yoke 42 hangs from bracket 43 which is attached to arm 10 and engages a pair of fulcrum bases 44, all of scale parts 39 to 44 being conventional. Also, conventional set-screw 45 for positioning slide 7 on beam 6 and counter weight 46 which may be rotated on screw 47 to adjust the balance of the scale.

Combined pilot and motor valve housing 25 has a body 48 screw-threaded at 49 and 50. Body 48 has a central cavity 51 into which projects an orifice or nozzle 52. Body 48 has two openings leading to space 51, namely, openings 53 and 54. Opening 53 is the outlet and is connected by the downstream portion of pipe 17 to valve 19 and cylinder 4. Opening 54 is the inlet and is connected by the upstream portion of pipe 17 to pump 20. In operation the pressure of liquid in 54 is enough over that in 53 to force valve 64 open whenever valve 69 closes 31 and vents space 66 to the atmosphere through tube 68, as the pressure on 56 is always atmospheric due to the central hole in the end of 59. Fitting around orifice 52 and slidable relative thereto is a yoke 55 to which is screw-threaded a nut 56, washer 57, and flexible diaphragm 58. Any other suitable means of securing flexible diaphragm 58 would be within the scope of my invention.

To secure flexible diaphragm 58 in place, a cover plate 59 may be employed; but, obviously, cover plate 59 may be eliminated and merely threaded sleeve 60 employed as shown sleeve 60 holding 59 in place, but, as suggested, sleeve 60 would directly contact diaphragm 58.

When this portion of the device has been assembled, flexible diaphragm 61 may be similarly secured by nut 62 and related parts to valve plate 63. Valve plate 63 has a sealing insert 64 which seats on orifice 52 acting as a valve head and forming a valve therewith. With diaphragm 61 secured, plate 63 is secured onto yoke 55 and then bonnet 65 is put in place and secured by any suitable means such as a threaded cylinder 60.

Bonnet 65 contains a chamber 66 from which a T-shaped passage 67 leads to an inlet pipe 31 (also shown in Figure 1) and an atmospheric vent pipe 68; pipes 31 and 68 forming two branches of the T and providing valve seats for a pilot valve 69 to alternately seat upon. The pilot valve 69 is preferably made of a plug of synthetic rubber.

Connected to chamber 66 at any point and not necessarily at the T as shown is a pipe 70 running to a pressure gage 71, which pressure gage acts as an indicator as to whether cylinder 4 is loaded or not.

To position pilot valve 69, a push pin 72 is provided extending up into atmospheric outlet 68 and into contact with pilot valve 69. The lower end of push pin 72 rests on any convenient portion of scale arm 6, or any other moving portion of the particular type scale employed.

In general, the motor valve mechanism 64 and 52 is controlled by the scale beam 6 through a small pilot valve arrangement 31, 69, and 68. As shown, the pressure fluid from line 31 loads the motor valve 63 to close it. It is obvious that this same motor valve pressure could be arranged to open the valve, opposing a spring 80 that would normally keep the valve closed. In such instance, push pin 72 should be on the other side of fulcrum 44 in order to close the valve by spring pressure when cylinder 4 was loaded. This modification is shown in Figure 3. As exactly the same parts are employed, the same reference numerals are used, with the exception of the added helical compression spring 80, which holds valve 64 against and closing seat 52, except when overcome by pressure from line 31 pressing against diaphragm 58 and nut 56. Note that bonnet 65 and cover plate 59 are in exchanged positions from the positions they occupied in Figure 2.

Also, the valve assembly is shown mounted above the scale beam. Obviously, these assemblies could also be made below the scale beam on opposite sides of the fulcrum 44 without departing from the scope of the invention.

*Operation*

The operation is believed obvious.

Container 4 is placed on platform 5 and connection 18 is connected so that liquid line 17 will connect with inlet 16 and valve 19 is opened. Switch 23 is closed actuating pump 20, or if some other type prime mover is employed it is set in motion by suitable means. Then bell crank latch 12 is tripped, allowing beam 6 to swing freely. The desired weight of container 4 and desired contents have already been set by slide 7 and weights 8. Counter weight 46 has, of course, been adjusted to take into account the weight of push pin 72 resting thereon.

Weight 8 times its lever arm to 44 being greater than weight 4 times the lever arm from 41 to 44, the weight goes down carrying the opposite end 46 of scale beam 6 up forcing push pin 72 to unseat pilot valve plug 69 from seat 68 and to force it to seat on seat 31. Fluid in gage 71 and space 66 immediately escapes through atmospheric vent 68 and liquid being withdrawn from tank 13 and pumped by pump 20 through line 17 enters through opening 54 and orifice 52 pushing back motor valve diaphragm plate 63 and passing out opening 53 through line 17 to inlet 16 and into container 4.

When container 4 contains the required weight of liquid, this weight times its lever arm balances with weight 8 times its lever arm and the scale beam 6 moves into position of Figure 2 allowing plug 69 to seat on valve seat 68. Immediately pressure fluid from 31 enters through passage 67 and pushes plate 63 to the right, into the position shown, closing valve 52, 64 against the pump pressure coming in pipe 54 and atmospheric pressure coming in cap 59 and pressing against diaphragm 59. At the same time, pressure fluid runs through pipe 70 to actuate gage 71 which indicates that cylinder 4 is filled. The only manual operation required before container 4 is disconnected from 18 is the closing of valve 19. This prevents flow of liquid through line 17, regardless of the position of the scale beam 6.

The pressure in space 51 is balanced as this pressure presses with equal force on diaphragms 61 and 58, therefore allowing the pressure fluid in space 66 and the pump pressure of the liquid in 54 to actuate the motor valve 52, 64 as controlled by plug 69.

The pressure fluid in pipe 31 may be vapor from space 15 with valve 29 open and 30 closed. The pressure of the pressure fluid in 31 being regulated by regulator 32 and the vapor in space 15 augmented, if necessary, by heat at 34, which heat may be controlled by 36. Or valve 29 may be closed and valve 30 opened and any source of fluid under pressure attached to pipe 33.

While a specific embodiment of my invention has been shown for illustrative purposes, it should be obvious that numerous changes in design, proportion, and arrangement of parts, and that substitution of equivalents may be made by a mechanic skilled in the art without departing from the scope of the present invention as set forth in the following claims.

Having described my invention, I claim:

1. A container filling system for filling a container having an inlet with a measured weight of volatile liquid comprising in combination a scale adapted to support and weigh said container, a source of said liquid having a vapor outlet and a liquid outlet, a liquid line connected to said liquid outlet and to the inlet of said container, a motor valve controlling flow in said liquid line, a pump in said liquid line between said liquid outlet and said motor valve for pumping liquid from said source to said container, a return line connecting said liquid line between said motor valve and said pump with said source, a pressure relief valve in said return line for relieving a predetermined excess pressure from said liquid line back into said source, a supply of fluid at a constant pressure comprising a vapor line connecting said vapor outlet and the inlet of the motor of said motor valve and a constant pressure controlling regulator in said vapor line, and valve means controlled by said scale for admitting said fluid to said motor of said motor valve to close said motor valve when said container and contents reach a predetermined weight.

2. A container filling system for filling a container having an inlet with a measured weight of volatile liquid comprising in combination a scale adapted to support and weigh said container, a source of said liquid having a vapor outlet and a liquid outlet, a liquid line connected to said liquid outlet and to the inlet of said container, a motor valve controlling flow in said liquid line, a pump in said liquid line between said liquid outlet and said motor valve for pumping liquid from said source to said container, a supply of fluid at a constant pressure comprising a vapor line connecting said vapor outlet and the inlet of the motor of said motor valve and a constant pressure controlling regulator in said vapor line, and valve means controlled by said scale for admitting said fluid to said motor of said motor valve to close said motor valve when said container and contents reach a predetermined weight.

3. A container filling system for filling a container having an inlet with a measured weight of volatile liquid comprising in combination a scale adapted to support and weigh said container, a source of said liquid having a vapor outlet and a liquid outlet, a liquid line connected to said liquid outlet and to the inlet of said container, a motor valve controlling flow in said liquid line, a supply of fluid at a constant pressure comprising a vapor line connecting said vapor outlet and the inlet of the motor of said motor valve and a constant pressure controlling regulator in said vapor line, and valve means controlled by said scale for admitting said fluid to said motor of said motor valve to close said motor valve when said container and contents reach a predetermined weight.

4. A container filling system for filling a container having an inlet with a measured weight of volatile liquid comprising in combination a scale adapted to support and weigh said container, a source of said liquid having a vapor outlet and a liquid outlet, a liquid line connected to said liquid outlet and to the inlet of said container, a motor valve controlling flow in said liquid line, a pump in said liquid line between said liquid outlet and said motor valve for pumping liquid from said source to said container, a return line connecting said liquid line between said motor valve and said pump with said source, a pressure relief valve in said return line for relieving a predetermined excess pressure from said liquid line back into said source, a supply of fluid at a constant pressure comprising a vapor line connecting said vapor outlet and the inlet of the motor of said motor valve, and valve means controlled by said scale for admitting said fluid to said motor of said motor valve to close said motor valve when said container and contents reach a predetermined weight.

5. A container filling system for filling a container having an inlet with a measured weight of volatile liquid comprising in combination a scale adapted to support and weigh said container, a source of said liquid having a vapor outlet and a liquid outlet, a liquid line connected to said liquid outlet and to the inlet of said container, a motor valve controlling flow in said liquid line, a pump in said liquid line between said liquid outlet and said motor valve for pumping liquid from said source to said container, a supply of fluid at a constant pressure comprising a vapor line connecting said vapor outlet and the inlet of the motor of said motor valve, and valve means controlled by said scale for admitting said fluid to said motor of said motor valve to close said motor valve when said container and contents reach a predetermined weight.

6. A container filling system for filling a container having an inlet with a measured weight of volatile liquid comprising in combination a scale adapted to support and weigh said container, a source of said liquid having a vapor outlet and a liquid outlet, a liquid line connected to said liquid outlet and to the inlet of said container, a motor valve controlling flow in said liquid line, a supply of fluid at a constant pressure comprising a vapor line connecting said vapor outlet and the inlet of the motor of said motor valve, and valve means controlled by said scale for admitting said fluid to motor of said motor valve to close said motor valve when said container and contents reach a predetermined weight.

7. A container filling system for filling a container having an inlet with a measured weight of volatile liquid comprising in combination a scale adapted to support and weigh said container, a source of said liquid having a vapor outlet and a liquid outlet, a liquid line connected to said liquid outlet and to the inlet of said container, a motor valve having a fluid motor with an inlet and an outlet, said motor actuating said motor valve, said motor valve having an open and closed position, means normally biasing said motor valve into one of said positions, said motor valve controlling flow in said liquid line, a pump in said liquid line between said liquid outlet and said motor valve for pumpng liquid from said source to said container, a return line connecting said liquid line between said motor valve and said pump with said source, a pressure relief valve in said return line for relieving a predetermined excess pressure from said liquid line back into said source, a supply of fluid at a constant pressure comprising a vapor line connecting said vapor outlet and the inlet of the motor of said motor valve and a constant pressure controlling regulator in said vapor line, and valve means controlled by said scale controlling flow of fluid in said vapor line to actuate said motor valve in combination with said biasing means to open said motor valve whenever said container and contents is below a predetermined weight and close said motor valve whenever said container and contents exceed said predetermined weight.

8. A container filling system for filling a container having an inlet with a measured weight of volatile liquid comprising in combination a scale adapted to support and weigh said container, a source of said liquid having a vapor outlet and a liquid outlet, a liquid line connected to said liquid outlet and to the inlet of said container, a motor valve having a fluid motor with an inlet and an outlet, said motor actuating said motor valve, said motor valve having an open and closed position, means normally biasing said motor valve into one of said positions, said motor valve controlling flow in said liquid line, a pump in said liquid line between said liquid outlet and said motor valve for pumping liquid from said source to said container, a supply of fluid at a constant pressure comprising a vapor line connecting said vapor outlet and the inlet of the motor of said motor valve and a constant pressure controlling regulator in said vapor line, and valve means controlled by said scale controlling flow of fluid in said vapor line to actuate said motor valve in combination with said biasing means to open said motor valve whenever said container and contents is below a predetermined weight and close said motor valve whenever said container and contents exceed said predetermined weight.

9. A container filling system for filling a container having an inlet with a measured weight of volatile liquid comprising in combination a scale adapted to support and weigh said container, a source of said liquid having a vapor outlet and a liquid outlet, a liquid line connected to said liquid outlet and to the inlet of said container, a motor valve having a fluid motor with an inlet and an outlet, said motor actuating said motor valve, said motor valve having an open and closed position, means normally biasing said motor valve into one of said positions, said motor valve controlling flow in said liquid line, a supply of fluid at a constant pressure comprising a vapor line connecting said vapor outlet and the inlet of the motor of said motor valve and a constant pressure controlling regulator in said vapor line, and valve means controlled by said scale controlling flow of fluid in said vapor line to actuate said motor valve in combination with said biasing means to open said motor valve whenever said container and contents is below a predetermined weight and close said motor valve whenever said container and contents exceed said predetermined weight.

10. A container filling system for filling a container having an inlet with a measured weight of volatile liquid comprising in combination a scale adapted to support and weigh said container, a source of said liquid having a vapor outlet and a liquid outlet, a liquid line connected to said liquid outlet and to the inlet of said container, a motor valve having a fluid motor with an inlet and an outlet, said motor actuating said motor valve, said motor valve having an open and closed position, means normally biasing said motor valve into one of said positions, said motor valve controlling flow in said liquid line, a pump in said liquid line between said liquid outlet and said motor valve for pumping liquid from said source to said container, a return line connecting said liquid line between said motor valve and said pump with said source, a pressure relief valve in said return line for relieving a predetermined excess pressure from said liquid line back into said source, a supply of fluid at a constant pressure comprising a vapor line connecting said vapor outlet and the inlet of the motor of said motor valve, and valve means controlled by said scale controlling flow of fluid in said vapor line to actuate said motor valve in combination with said biasing means to open said motor valve whenever said container and contents is below a predetermined weight and close said motor valve whenever said container and contents exceed said predetermined weight.

11. A container filling system for filling a container having an inlet with a measured weight of volatile liquid comprising in combination a scale adapted to support and weigh said container, a source of said liquid having a vapor outlet and a liquid outlet, a liquid line connected to said liquid outlet and to the inlet of said container, a motor valve having a fluid motor with an inlet and an outlet, said motor actuating said motor valve, said motor valve having an open and closed position, means normally biasing said motor valve into one of said positions, said motor valve controlling flow in said liquid line, a pump in said liquid line between said liquid outlet and said motor valve for pumping liquid from said source to said container, a supply of fluid at a constant pressure comprising a vapor line connecting said vapor outlet and the inlet of the motor of said motor valve, and valve means controlled by said scale controlling flow of fluid in said vapor line to actuate said motor valve in combination with said biasing means to open said motor valve whenever said container and contents is below a predetermined weight and close said motor valve whenever said container and contents exceed said predetermined weight.

12. A container filling system for filling a container having an inlet with a measured weight of volatile liquid comprising in combination a scale adapted to support and weigh said container, a source of said liquid having a vapor outlet and a liquid outlet, a liquid line connected to said liquid outlet and to the inlet of said container, a motor valve having a fluid motor with an inlet and an outlet, said motor actuating said motor valve, said motor valve having an open and closed position, means normally biasing said motor valve into one of said positions, said motor valve controlling flow in said liquid line, a supply of fluid at a constant pressure comprising a vapor line connecting said vapor outlet and the inlet of the motor of said motor valve, and valve means controlled by said scale controlling flow of fluid in said vapor line to actuate said motor valve in combination with said biasing means to open said motor valve whenever said container and contents is below a predetermined weight and close said motor valve whenever said container and contents exceed said predetermined weight.

THEODORE A. ST. CLAIR.

REFERENCES CITED

The following references are of record in the file of this patent:

UNITED STATES PATENTS

| Number | Name | Date |
|---|---|---|
| 1,116,466 | Mulligan | Nov. 10, 1914 |
| 1,616,785 | Darby | Feb. 8, 1927 |
| 1,840,906 | Larsen et al. | Jan. 12, 1932 |
| 2,261,827 | Brown et al. | Nov. 4, 1941 |
| 2,264,562 | Bryant et al. | Dec. 2, 1941 |
| 2,365,650 | Shaw | Dec. 19, 1944 |
| 2,387,894 | Fannin | Oct. 30, 1945 |
| 2,425,844 | Spaulding | Aug. 19, 1947 |